UNITED STATES PATENT OFFICE.

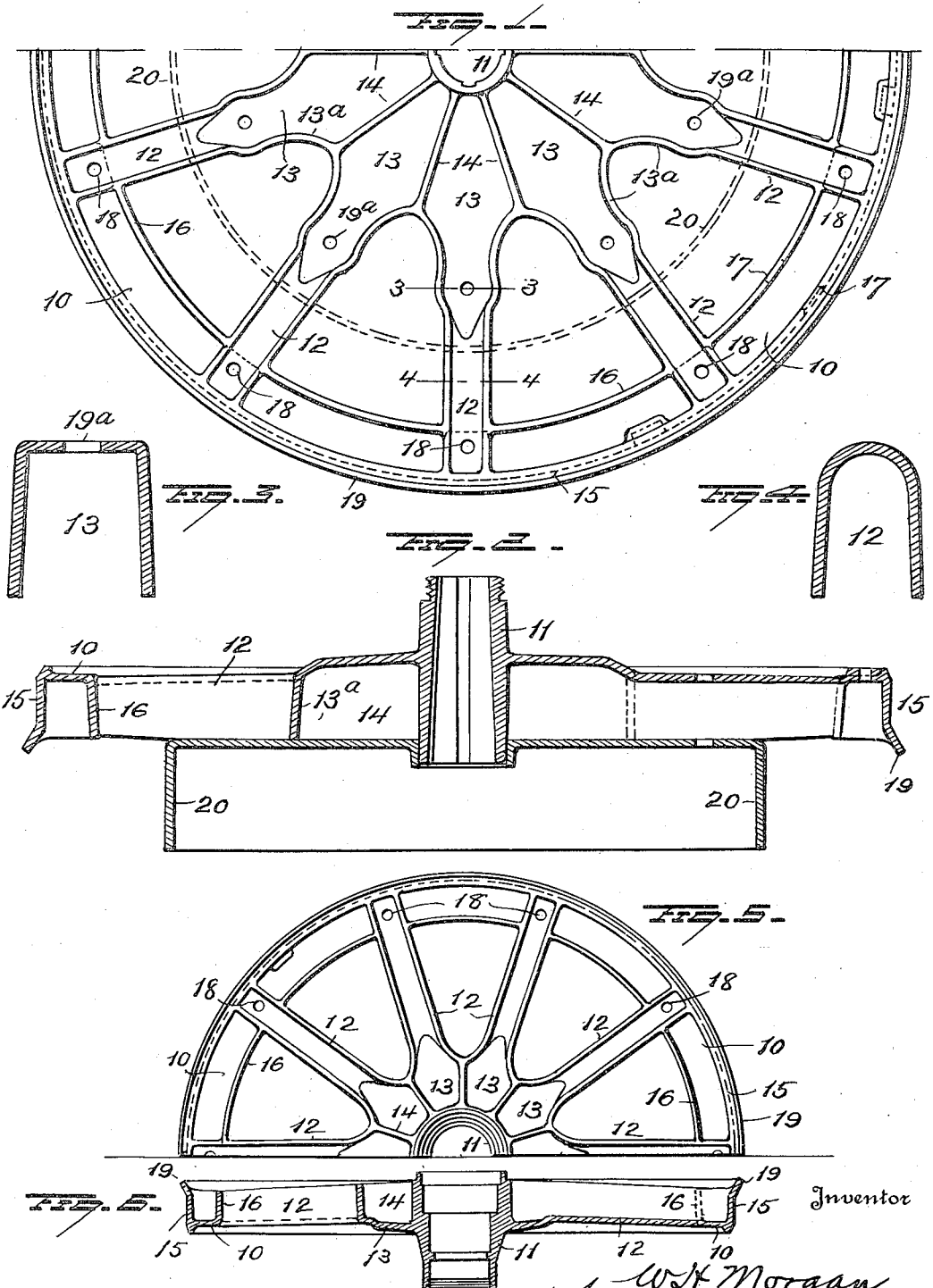

WILLIAM HENRY MORGAN, OF ALLIANCE, OHIO.

CAST METAL WHEEL.

1,414,662.  Specification of Letters Patent.  Patented May 2, 1922.

Application filed June 22, 1921. Serial No. 479,616.

*To all whom it may concern:*

Be it known that I, WILLIAM H. MORGAN, a citizen of the United States, and a resident of Alliance, in the county of Stark and State of Ohio, have invented certain new and useful Improvements in Cast Metal Wheels; and I do hereby declare the following to be a full, clear, and exact description of the invention, such as will enable others skilled in the art to which it appertains to make and use the same.

My invention relates to an improvement in cast metal wheels designed particularly for self propelled vehicles and it consists in a cast metal wheel the spokes and felly of which are U-shape in cross section so that the pattern makes its own core in the sand thus facilitating casting. It further consists in certain details in construction as will be more fully explained and pointed out in the claims.

In the accompanying drawing, Figure 1 is a view in elevation of a wheel part of it being broken away and the brake drum shown in dotted lines; Figure 2 is a view in section of the same, the brake drum being shown in full lines; Figure 3 is a view in section on the line 3—3 of Figure 1; Figure 4 is a view in section on the line 4—4 of Figure 1, and Figures 5 and 6 are views similar to Figures 1 and 2 respectively of a front or steering wheel.

The wheel comprises a felly 10, hub 11 and spokes 12 all cast integral. The spokes are connected adjacent the hub, by an integral web 13 which merges into the spokes and which is reinforced by the ribs 14 extending from the outer marginal flange 13ª of the web to the hub, between each two spokes. The hub projects at both sides of the spokes, as shown in Figures 2 and 6, and the spokes 12 are continued out to the outer wall 15 of the felly as shown in Figures 1 and 6.

The spokes are U-shape in cross section, the open face being at the rear or inner side, and the felly which is also open at the rear, consists of an outer continuous wall or flange 15, and inner flanges 16 connecting the spokes and integral with the latter, the said inner flanges being concentric with flange 15 and forming therewith the U-shaped felly open at the rear or inner side of the wheel. The spokes, as before explained are continued to the outer flange 15 of the felly, and are preferably widened or enlarged laterally at their inner ends or at the points where they merge into the web 13.

With this construction the outer faces of the spokes and felly are closed and can of course be shaped and finished to resemble the wheel they are intended to supplant and by making them open at the rear or inner sides, it will be seen that the pattern for the wheel makes its own core in the sand thus facilitating casting.

The outer flange 15, and one of the flanges 16 adjacent the same are provided with alined drilled openings 17 for the passage of the air valve tube of the tire.

The outer or side wall of the felly is provided at the juncture of each spoke therewith, with a hole 18 for the passage of a bolt for securing the demountable rim or tire holding clips in place and the felly is bent outwardly at one edge as at 19, to form an inclined peripheral shoulder against which the demountable rim rests and against which it is held, by a ring, which in turn is held in place by clips above referred to, in the well known manner.

The spokes of the rear or driving wheels as shown in Figures 1 and 2 are provided adjacent the merger of the spokes with the web, with holes 19 for the passage of bolts which secure the brake drum 20 in place. The front or steering wheels shown in Figures 5 and 6 are identical with the driving wheels except as to the holes for the attachment of the brake drum. The hubs of the driving wheels are of course keyed to the driving axle, whereas the front or steering wheels rotate on the stub axles which are connected up to the steering gear in the well known manner.

Wheels thus constructed, by reason of the reinforced integral web 13, and the fact that their side walls or members of the spokes are located transversely of the wheel and are preferably of greater width than the width of the front face of the spokes, provides for the greatest possible side strength, thus preventing the wheel from collapsing from side pressure due to any cause, such as centrifugal force in going around curves, skidding, or being sideswiped or side ditched, which throws most of the weight of the car sidewise on the wheels. In actual tests there was no deflection of a wheel supported by the rim and a load of 10,000 pounds applied to the hub; a load of 20,000 pounds bent the wheel but slightly, and it took a load of 50,000 pounds, or twenty five tons to deflect the rim, which deflection was bent back into shape without injury to the wheel.

Again cast steel wheels dissipate the heat generated from the brake drums and tires and by making the wheel in a single casting we eliminate approximately seventy two parts used in the wheel this wheel is designed to supplant. The wheel after casting, is subjected to heat treatment after which it is bored and turned at one setting of the machine, thus insuring perfect rotation which cannot be disturbed by changes in temperature, wear or water.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. As a new article of manufacture, a metal wheel comprising a hub, hollow web having a marginal flange, spokes and a hollow felly all cast integral, the web merging into the spokes and provided with reinforcing ribs located in planes intermediate the spokes and extending from the marginal flange of the web to the hub.

2. As a new article of manufacture, a metal wheel comprising a hub, a web open at one side, and spokes and felly all cast integral, the spokes extending from the web to the outer flange or wall of the felly.

3. As a new article of manufacture a metal wheel comprising a hub, a web open at one side and U-shaped spokes and felly all cast integral, the spokes extending from the web to the outer flange or wall of the felly.

4. As a new article of manufacture, a metal wheel comprising a hub, a flanged web open at one side and U-shaped spokes and felly all cast integral, the web having reinforcing ribs extending from the outer flange thereof to the hub, the said flanges being in planes intermediate the spokes.

5. As a new article of manufacture, a metal wheel comprising a hub, a flanged web open at one side and U-shaped spokes and felly all cast integral, the spokes extending from the outer flanged edge of the web to the outer flange or wall of the felly.

6. As a new article of manufacture, a metal wheel comprising a hub, a flanged web open at one side and U-shaped spokes and felly all cast integral, the web being reinforced intermediate the spokes by integral ribs extending from the outer flange of the web to the hub, and the spokes extending from the outer edge of the web to the outer wall of the felly.

In testimony whereof, I have signed this specification in the presence of two subscribing witnesses.

WILLIAM HENRY MORGAN.

Witnesses:
N. C. FETTERS,
F. S. WILLIAMSON.